US009100715B2

(12) United States Patent
Choi et al.

(10) Patent No.: US 9,100,715 B2
(45) Date of Patent: Aug. 4, 2015

(54) APPARATUS AND METHOD FOR CONTROLLING OUTPUT OF PROTECTED CONTENT ON A TELEVISION

(75) Inventors: Jongsung Choi, Pyeongtaek-si (KR); Kunil Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 203 days.

(21) Appl. No.: 13/396,087

(22) Filed: Feb. 14, 2012

(65) Prior Publication Data

US 2012/0297413 A1 Nov. 22, 2012

(30) Foreign Application Priority Data

May 18, 2011 (KR) ........................ 10-2011-0047051

(51) Int. Cl.

| H04N 7/16 | (2011.01) |
| H04N 7/167 | (2011.01) |
| H04N 21/6377 | (2011.01) |
| H04N 21/418 | (2011.01) |
| H04N 21/435 | (2011.01) |
| H04N 21/4623 | (2011.01) |
| H04N 21/266 | (2011.01) |
| H04N 21/258 | (2011.01) |

(52) U.S. Cl.
CPC ........... *H04N 21/6377* (2013.01); *H04N 7/163* (2013.01); *H04N 7/165* (2013.01); *H04N 7/1675* (2013.01); *H04N 21/25816* (2013.01); *H04N 21/26606* (2013.01); *H04N 21/4181* (2013.01); *H04N 21/4182* (2013.01); *H04N 21/435* (2013.01); *H04N 21/4353* (2013.01); *H04N 21/4623* (2013.01); *H04N 21/63775* (2013.01)

(58) Field of Classification Search
None
See application file for complete search history.

(56) References Cited

U.S. PATENT DOCUMENTS

| 5,153,919 | A  | * | 10/1992 | Reeds et al. ................... 380/44 |
| 5,974,312 | A  | * | 10/1999 | Hayes et al. .................. 455/419 |
| 6,112,083 | A  | * | 8/2000 | Sweet et al. ............... 455/426.1 |
| 6,516,412 | B2 | * | 2/2003 | Wasilewski et al. .......... 713/168 |
| 6,810,525 | B1 | * | 10/2004 | Safadi et al. ...................... 725/1 |
| 7,925,882 | B2 | * | 4/2011 | Hirano ........................ 713/176 |
| 7,987,515 | B2 | * | 7/2011 | Kori ............................... 726/27 |
| 8,332,536 | B2 | * | 12/2012 | Bellwood et al. ............ 709/238 |
| 8,359,392 | B2 | * | 1/2013 | Garbajs et al. ............... 709/227 |
| 8,365,267 | B2 | * | 1/2013 | Wang et al. ....................... 726/8 |
| 8,371,499 | B2 | * | 2/2013 | Manuel-Devadoss ........ 235/375 |
| 8,832,726 | B2 | * | 9/2014 | Adimatyam et al. ........... 725/29 |
| 2004/0030908 | A1 | * | 2/2004 | Lin et al. ....................... 713/193 |
| 2004/0117818 | A1 | * | 6/2004 | Karaoguz et al. ............... 725/31 |
| 2004/0128680 | A1 | * | 7/2004 | Karaoguz et al. ............... 725/25 |
| 2005/0010769 | A1 | * | 1/2005 | You et al. ...................... 713/168 |
| 2006/0020974 | A1 | * | 1/2006 | Birnbaum et al. .............. 725/50 |
| 2006/0041905 | A1 | * | 2/2006 | Wasilewski ..................... 725/31 |
| 2006/0264259 | A1 | * | 11/2006 | Zalewski et al. ............... 463/36 |
| 2006/0271996 | A1 | * | 11/2006 | Sato ............................. 725/135 |
| 2007/0074241 | A1 | * | 3/2007 | Yeo ................................. 725/31 |
| 2008/0092200 | A1 | * | 4/2008 | Grady et al. .................. 725/133 |
| 2009/0254964 | A1 | * | 10/2009 | Park et al. .................... 725/134 |
| 2010/0287585 | A1 | * | 11/2010 | Frondal et al. ................. 725/31 |
| 2010/0325654 | A1 | * | 12/2010 | Moroney et al. ............... 725/30 |

\* cited by examiner

*Primary Examiner* — Jonathan V Lewis
(74) *Attorney, Agent, or Firm* — KED & Associates LLP

(57) ABSTRACT

An apparatus for a television includes storage areas for storing a key and authentication information, a communication unit to transmit and receive information from a server supplying protected content, and a controller to control output of the protected content from the server based on an authentication procedure. This procedure includes encrypting the stored authentication information with the key, transmitting the encrypted authentication information to the server, and then outputting the protected content received from the server for display after transmission of the encrypted authentication information if determined to be valid.

12 Claims, 8 Drawing Sheets

APPARATUS AND METHOD FOR CONTROLLING OUTPUT OF PROTECTED CONTENT ON A TELEVISION

CROSS-REFERENCE TO RELATED APPLICATIONS

This application claims the benefit of Korean Application No. 10-2011-0047051, filed on May 18, 2011, the contents of which are incorporated by reference.

BACKGROUND

1. Field

One or more embodiments described herein relate to controlling access to information for display on a television or other display device.

2. Background

In order to receive content on a mobile user terminal such as a pod-type device, consideration must be given as to whether the content is protected. If the content is protected, a procedure may be performed for authenticating the rights of the user to receive the content. The content may include, for example, Video on Demand or other forms of multimedia content, music, and/or any one of a variety of Internet services. While rights-based protection and authentication procedures have been implemented for smart phones and pods, no procedures have been used for televisions and/or other forms display-type devices.

DETAILED DESCRIPTION

Figure 1:
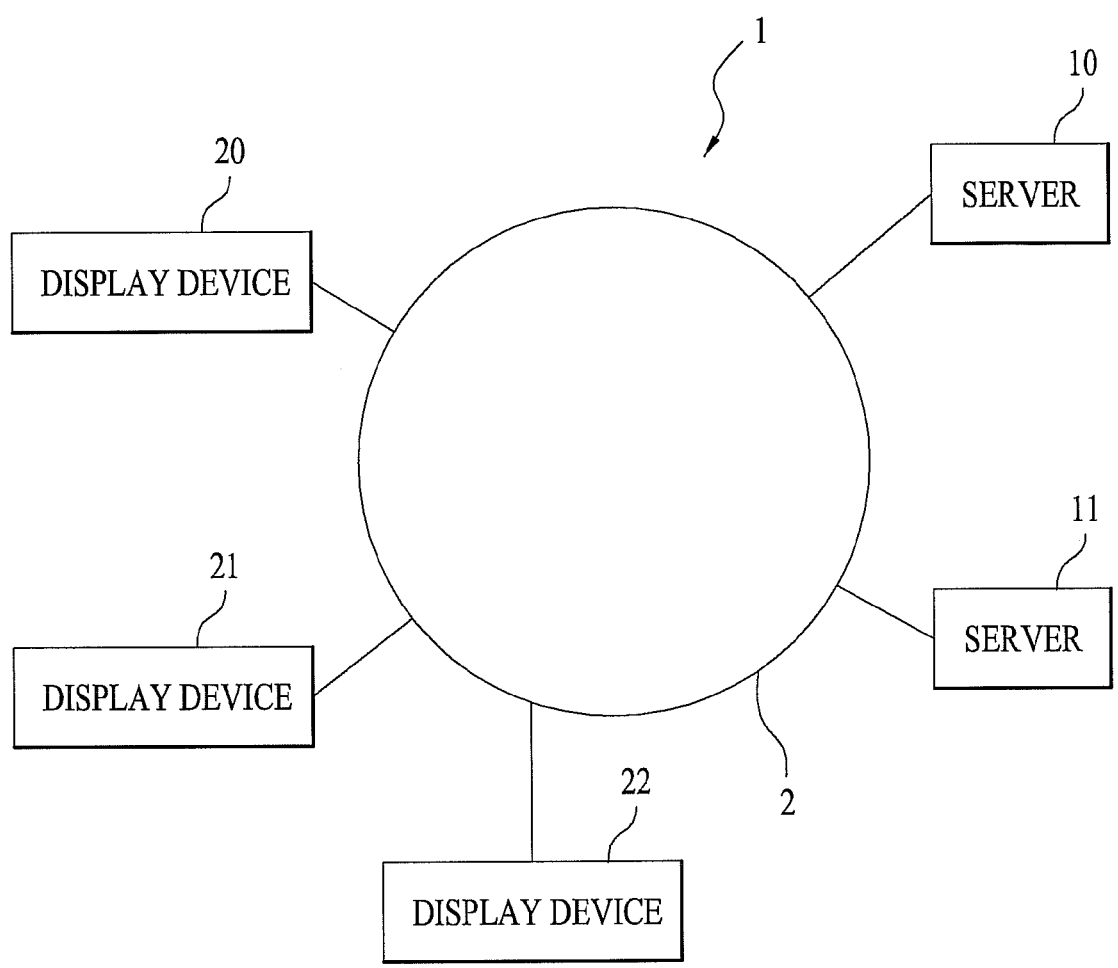
FIG. 1 shows a service provision system.

FIG. 1 is a block diagram showing one embodiment of a service provision system including one or more servers 10 and 11 and one or more display devices 20, 21 and 22. The servers 10 and 11 and the display devices 20, 21 and 22 may be connected over a network 2.

The network 2 may include a backbone network and a subscriber network. The backbone network may include one or a plurality of networks of an X.25 network, frame relay network, ATM network, Multi Protocol Label Switching (MPLS) network and Generalized Multi Protocol Label Switching (GMPLS). The subscriber network may include Fiber To The Home (FTTH), Asymmetric Digital Subscriber Line (ADSL), cable network, Wireless LAN (IEEE 802.11b, IEEE 802.11a, IEEE802.11g, IEEE802.11n), Wireless Broadband (Wlbro), WiMax and High Speed Downlink Packet Access (HSDPA). In some embodiments, the network 2 may be an Internet protocol network.

The server 10 or the server 11 may be a service provider or a content provider. The server 10 and the server 11 may provide real-time broadcast services and Internet services to the display devices 20, 21 and 22. The Internet service refers to a service which may be provided through the Internet, such as a Content on Demand (CoD) service, a YouTube service, an information service such as weather, news, regional information and search, an entertainment service such as games and karaoke, a communication service such as a TV mail and a TV Short Message Service (SMS).

The display device 20, the display device 21 and the display device 22 are connected to at least one of the server 10 and the server 11 so as to receive the real-time broadcast services and the Internet services from the connected servers.

Figure 2:
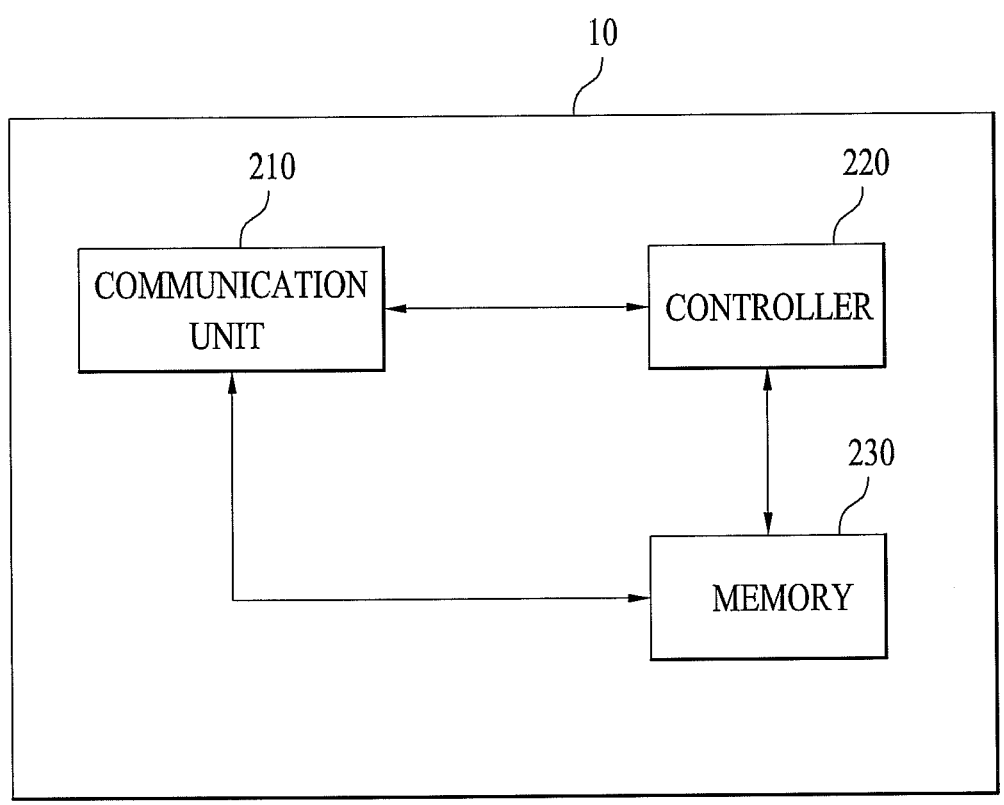
FIG. 2 shows one embodiment of a server in the system.

FIG. 2 shows one embodiment of server 10 including a communication unit 210, a controller 210 and a memory 230. The communication unit 210 may receive packets transmitted through the network 2 and transmit packets to the display device 20, the display device 21 and the display device 22 over the network 2. Packets may include a signal requesting authentication information or include a real-time broadcast service and an Internet service. The authentication information may be one of a string, an Electronic Serial Number (ESN) and a combination of a string and an ESN. A device user-agent may be information about a display device. For example, the device user-agent may be "User-agent: LG browser". The ESN may be one of a MAC address and a serial number.

The controller 210 may execute computer code along with an Operating System (OS) and perform an operation for generating and utilizing data. The controller 210 performs authentication of the display devices 20, 21 and 22 using authentication information received from the display devices 20, 21 and 22 and determines whether or not a service is provided to the display devices 20, 21 and 22 according to the result of authentication.

The memory 230 may store the authentication information of the display devices 20, 21 and 22 and public keys of the display devices 20, 21 and 22. The authentication information and the public keys may be received from manufacturers of the display devices 20, 21 and 22 in advance.

Figure 3:
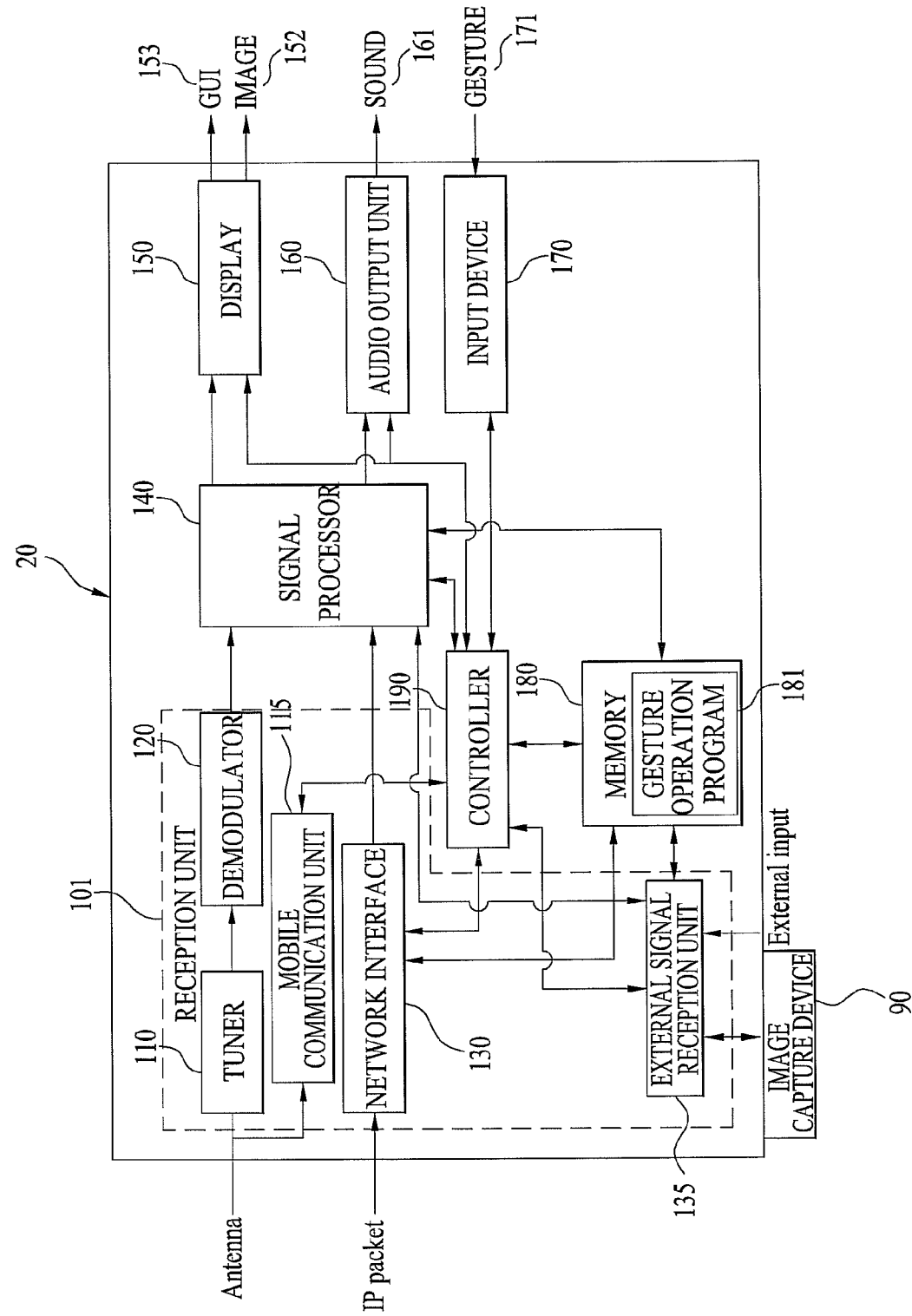
FIG. 3 shows one embodiment of a display device in the system.

FIG. 3 shows one embodiment of display device 20 which includes a reception unit 101, a signal processor 140, a display 150, an audio output unit 160, an input device 170, a memory 180 and a controller 190. The display device 20 may be a television or other display device, and may include an image capture device 90.

The reception unit 101 may receive a real-time broadcast service and an Internet service. The reception unit 101 may include a tuner 110, a demodulator 120, a mobile communication unit 115, a network interface 130 and an external signal reception unit 135.

The network interface 130 may transmit packets including a signal requesting connection and packets including authentication information to the server 10 over the network 2. The network interface 130 may receive packets including a signal requesting authentication information and packets including a service from the server 10 over the network 2. The service may include a real-time broadcast service and an Internet service.

The signal processor 140 demultiplexes a stream signal output from the demodulator 120, performs signal processing (video decoding and audio decoding) with respect to the demultiplexed signal, outputs an image to the display 150 and outputs sound to the audio output unit 160. The signal processor 140 may receive video data, audio data and broadcast data from the mobile communication unit 115, the network interface 130 and the external signal reception unit 135.

The display 150 displays an image 152. The display 150 may operate in association with the controller 190. The display 150 may display a Graphical User Interface (GUI) 153 for providing an interface which is easily used between a user of a display device and an OS or an application which is being executed on the OS.

The audio output unit 160 may receive audio data from the signal processor 140 and the controller 190 and output sound 161.

The input device 170 may be a touch screen which is located on or in front of the display 150 or a communication unit for receiving a signal from a remote controller.

The memory 180 generally stores program code and data used by the display device 20. The memory 180 may be a Read Only Memory (ROM), a Random Access Memory (RAM), a hard disk drive, etc. The program code and data may be stored in a detachable storage medium and, when needed, may be loaded or installed to or in the display device 20. The detachable storage medium may include a CD-ROM, a PC-CARD, a memory card, a floppy disk, a magnetic tape and a network component.

The memory 180 may store a device user-agent, a private key, a string and an ESN. The device user-agent, the private key, the string and the ESN may be encrypted and stored or may be stored when the display device 20 is manufactured. For example, the private key may be:

"MIIEpQIBAAKCAQEAyaf+ckZX6ajwQHojijDnsb-UKPuX36c3u7ZFMSQ KcqO1Q2uKqvl14oCVwq2I-3bfDgx012aXSbFvz06lDFmmGbg67BJnJpTrzO 2k/Xp2C+/huXlA8SGBVdwCfUdSbkxLDVOxzKWZZ-tJi4TNnZ5ENQTK GukaWLD3BopiNUKnCrhoCkf-2AYNC6aNJpK . . . ."

and ?PGP柔L項口豕认 cy昇詰遮 ???r?? ?'?平 Y땃 W9"? 됫]@??MX빡種넜 2y 맹\d??ZN?% 퓹!?]趾갞 ?(-?q' 琪?械?璐?? 냱? 껑*방 U? 열? 젔皇?h 仇 Hp?gP?}% 뒒짠 S 벤?T½= 뿔 鍍 9a 롤 ?? 林철S 晞 ?x 숲口 ?? 곰 C 쨧 H 겅口 {?>n?% 뻿쇗 ?K 뤱푝 \?&5?HE 붗麟 ????y7 鋿 0착 ?? 捱蕪쫙 씾蔣 ? 樬口*~뤍T^?箟口?活R景B怒?COev]Z柔?" which is a value obtained by encrypting the private key may be stored in the memory 180. The string may be "TV" and " 堧?6 켈" which is a value obtained by encrypting the string may be stored in the memory 180.

The controller 190 executes a command and performs an operation associated with the display device 20. For example, using the command retrieved from the memory 180, the controller 190 may control data input/output, reception and processing between components of the display device 20. The controller 190 may be implemented on a single chip, multiple chips or multiple electric parts. For example, various architectures including dedicated or embedded processors, single-purpose processors, controllers or ASICs may be used in the controller 190.

The controller 190 performs an operation for executing computer code along with an OS and generating and utilizing data. The OS is generally known and thus will not be described in detail. For example, the OS may include Windows, Unix, Linux, PalmOS, DOS, Android, and MacOS. The OS, other computer code, and data may be present in the memory 18 which operates in association with the controller 190.

The controller 190 may recognize a user action and control the display device 20 based on the recognized user action.

The user action may include a touch gesture and a space gesture. The touch gesture may be defined as a stylized interaction with the input device 170, which is mapped to one or more specific computing operations. The touch gesture may be performed through hand motion and, more particularly, finger motion. Additionally or alternatively, the gesture may be performed using a stylus.

The input device 170 receives a gesture 171 and the controller 190 executes commands for performing operations associated with the gesture 171. The memory 180 may include a gesture operation program 181 which may be part of an OS or an application. The gesture operation program 181 includes a series of commands for recognizing occurrence of the gesture 171 and informing one or more software agents of the gesture 171 and/or action(s) taken in response to the gesture 171.

The controller 190 may control transmission of a connection request signal requesting connection to the server 10, upon booting or according to user request. The input device 170 may receive a user action for requesting connection to the server 10 and the controller 190 may control transmission of a connection request signal to the server 10 using an operation associated with the user action. After booting is completed, the controller 190 may control transmission of the connection request signal to the server 10. The connection request signal may include a device user-agent.

Figure 4:
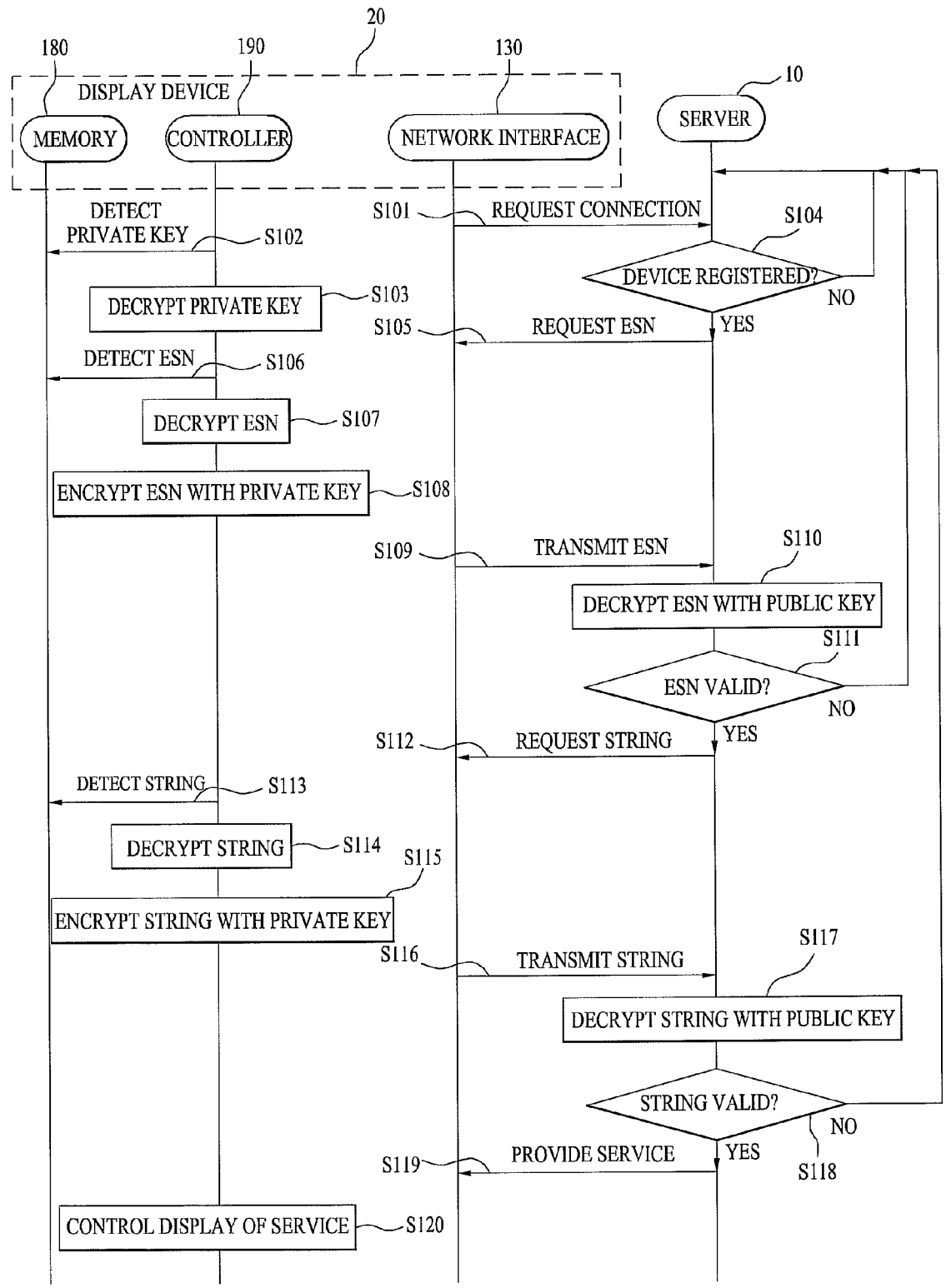
FIG. 4 shows one embodiment of a device authentication method.

FIG. 4 shows one embodiment of a device authentication method, in which network interface 130 may transmit a connection request signal to the server 10 under the control of the controller 190 (S101). The server 10 may receive the connection request signal. The connection request signal may include a device user-agent.

The controller 190 detects a private key stored in the memory 180 (S102).

The controller 190 decrypts the detected private key (S103).

The server 10 checks whether or not the display device 20 has been registered (S104). The controller 220 may check whether the display device 20 has been registered based on the device user-agent included in the connection request signal. In some embodiments, if the received connection request signal does not include the device user-agent, the controller 220 may request a device user-agent from the display device 20, receive the device user-agent from the display device 20, and check whether or not the display device 20 has been registered based on the received device user-agent.

The controller 220 may check whether the same device user-agent as the device user-agent received from the display device 20 is stored in the memory 230. If the device user-agent of the display device 20 is stored in the memory 230, the controller 220 checks that the display device 20 has been registered. In contrast, if the device user-agent of the display device 20 is not stored in the memory 230, the controller 220 checks that the display device 20 has not been registered.

Figure 7:
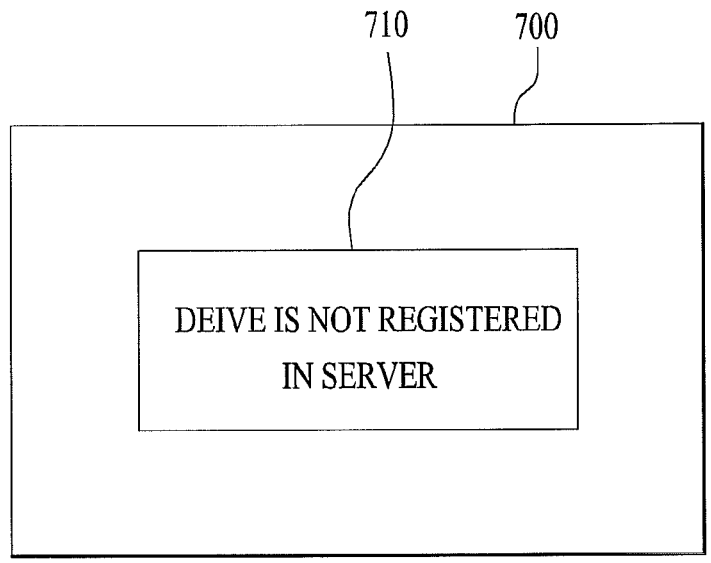
FIG. 7 shows a message for display when a device user-agent is invalid.

If it is determined that the display device 20 has not been registered, the server 10 may transmit a message 710 shown in FIG. 7 to the display device 20 and the display device 20 may display the message 710 on a screen 700. The message 710 may indicate that the display device 20 has not been registered in the server 10.

In some embodiments, step S104 may be performed in parallel to steps S102 and S103. That is, while the display device 20 performs steps S102 and S103, the server 10 may perform step S104.

If it is determined that the display device 20 has been registered, the server 10 transmits an ESN request signal to the display device 20 (S105). The network interface 130 may receive the ESN request signal from the server 10. The ESN request signal may be transmitted through a Hypertext Transfer Protocol over Secure Socket Layer (HTTPS) protocol. In some embodiments, steps S102 and S103 may be performed after step S105.

In response to reception of the ESN request signal, the controller 190 detects an ESN stored in the memory 180 (S106).

The controller 190 decrypts the detected ESN (S107). If the detected ESN is not encrypted, step S107 may not be performed.

The controller 190 encrypts the decrypted ESN with the private key decrypted in step S103 (S108). The controller 190 may encrypt the decrypted ESN using any one of a symmetric key algorithm or an asymmetric key algorithm. The controller 190 may use Data Encryption Standard (DES), triple-DES, Advanced Encryption Standard (AES), SEED and ARIA as the symmetric key algorithm. The controller 190 may use a Rivest-Shamir-Adleman (RSA) encryption algorithm as the asymmetric key algorithm. In some embodiments, steps S102 and S103 may be performed between steps S107 and S108.

The network interface 130 transmits the encrypted ESN to the server 10 (S109). The server 10 may receive the encrypted ESN. The display device 20 may transmit the encrypted ESN through a secure socket layer (SSL) and the server 10 may receive the encrypted ESN through the SSL.

The server 10 decrypts the ESN received in step S109 with a public key (S110). If the ESN is encrypted using the symmetric key algorithm, the controller 220 may decrypt the ESN with the same public key as the private key. If the ESN is encrypted using the asymmetric key algorithm, the controller 190 may decrypt the ESN with the public key corresponding to the private key. The private key is a private key of the display device 20 and the public key is a public key of the display device 20. The private key may be stored in the display device 20 when manufacturing the display device 20 and the server 10 may receive the public key corresponding to the private key from the manufacturer of the display device 20.

In some embodiments, if the ESN is encrypted using the asymmetric key algorithm, the ESN may be encrypted with the public key in step S108 and may be decrypted with the private key in step S110. In this case, the public key may be a public key of the server 10 and the private key may be a private key of the server 10. The manufacturer of the display device 20 may acquire the public key of the server 10 in advance and store the acquired public key in the display device 20. That is, the public key may be stored in the display device 20 when manufacturing the display device 20.

The server 10 checks whether the decrypted ESN is valid (S111). The controller 220 may check whether the same ESN as the decrypted ESN is stored in the memory 230. If the same ESN as the decrypted ESN is stored in the memory 230, the controller 220 may check that the decrypted ESN is valid. In contrast, if the same ESN as the decrypted ESN is not stored in the memory 230, the controller 220 may check that the decrypted ESN is not valid.

Figure 8:
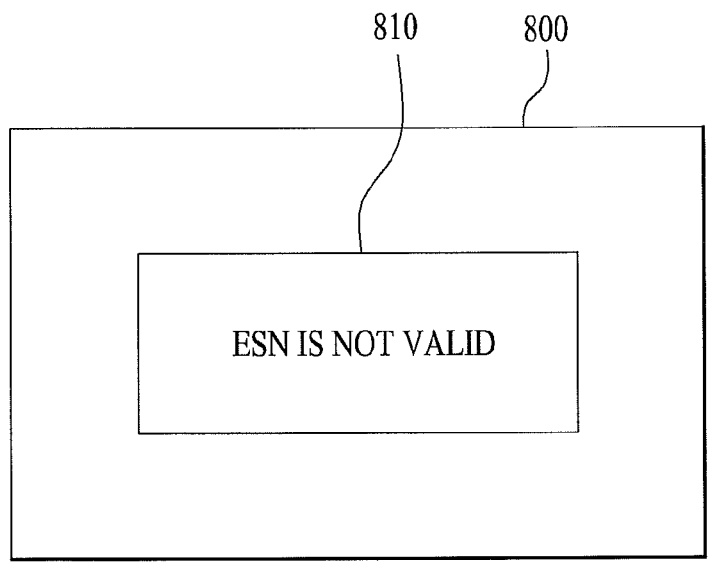
FIG. 8 shows a message for display when serial number is invalid.

If it is determined that the decrypted ESN is not valid, the server 10 may transmit a message 810 shown in FIG. 8 to the display device 20 and the display device 20 may display the message 810 on a screen 800. The message 810 may indicate that the ESN of the display device 20 is not valid.

If the decrypted ESN is valid, the server 10 transmits a string request signal to the display device 20 (S112). The network interface 130 may receive the string request signal from the server 10. The string request signal may be transmitted through HTTPS.

In response to reception of the string request signal, the controller 190 detects a string stored in the memory 180 (S113). The string may be encrypted and stored when manufacturing the display device 20. Since the device authentication method according to the present invention performs device authentication using the encrypted string, it is possible to prevent unauthorized access of the display device without access rights and prevent a display device without access rights from pretending to have access rights.

The controller 190 decrypts the detected string (S114).

The controller 190 encrypts the decrypted string with the private key decrypted in step S103 (S115). The controller 190 may encrypt the decrypted string using any one of a symmetric key algorithm or an asymmetric key algorithm. The controller 190 may use Data Encryption Standard (DES), triple-DES, Advanced Encryption Standard (AES), SEED and ARIA as the symmetric key algorithm. The controller 190 may use a Rivest-Shamir-Adleman (RSA) encryption algorithm as the asymmetric key algorithm.

The network interface 130 transmits the encrypted string to the server 10 (S116). The server 10 may receive the encrypted string. The display device 20 may transmit the encrypted string through a secure socket layer (SSL) and the server 10 may receive the encrypted string through the SSL.

The server 10 decrypts the string received in step S116 with a public key (S117). If the string is encrypted using the symmetric key algorithm, the controller 220 may decrypt the string with the same public key as the private key. If the string is encrypted using the asymmetric key algorithm, the controller 190 may decrypt the string with the public key corresponding to the private key. The private key is a private key of the display device 20 and the public key is a public key of the display device 20. The private key may be stored in the display device 20 when manufacturing the display device 20 and the server 10 may receive the public key corresponding to the private key from the manufacturer of the display device 20.

In some embodiments, if the string is encrypted using the asymmetric key algorithm, the string may be encrypted with the public key in step S115 and may be decrypted with the private key in step S117. In this case, the public key may be a public key of the server 10 and the private key may be a private key of the server 10. The manufacturer of the display device 20 may acquire the public key of the server 10 in advance and store the acquired public key in the display device 20. That is, the public key may be stored in the display device 20 when manufacturing the display device 20.

The server 10 checks whether the decrypted string is valid (S118). The controller 220 may check whether the same string as the decrypted string is stored in the memory 230. If the same string as the decrypted string is stored in the memory 230, the controller 220 may check that the decrypted string is valid. In contrast, if the same string as the decrypted string is not stored in the memory 230, the controller 220 may check that the decrypted string is not valid.

Figure 9:
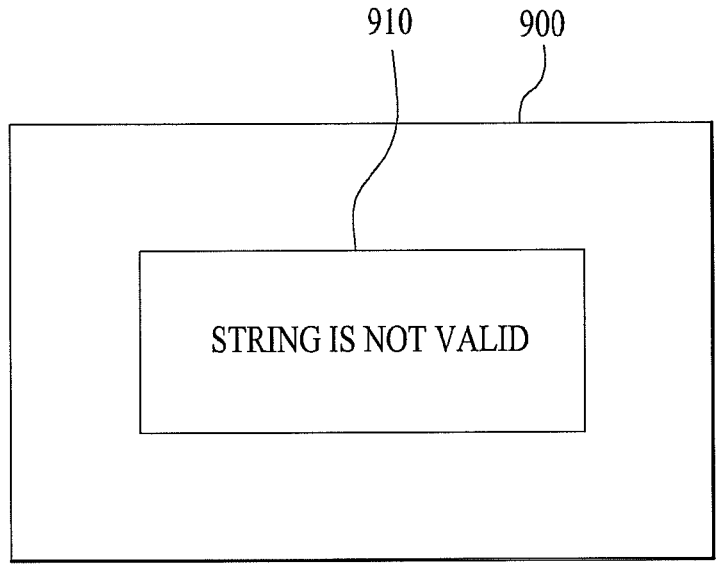
FIG. 9 shows a message for display when a string is invalid.

If it is determined that the decrypted string is not valid, the server 10 may transmit a message 910 shown in FIG. 9 to the display device 20 and the display device 20 may display the message 910 on a screen 900. The message 910 may indicate that the string of the display device 20 is not valid.

If the decrypted string is valid, the server 10 provides a service to the display device 20 (S119). That is, if the decrypted string is valid, the display device 20 successfully performs device authentication. The network interface 130 may receive the service from the server 10. The service may be at least one of a real-time broadcast service and an Internet service.

The controller 190 controls the display of the service received from the server 10 (S120). That is, the display 150 may display the image of the received service on the screen and the audio output unit 160 may output the sound of the received service. In some embodiments, after steps S101 to S111 are performed, if the decrypted string is valid, steps S119 and S120 may be performed.

Figure 5:
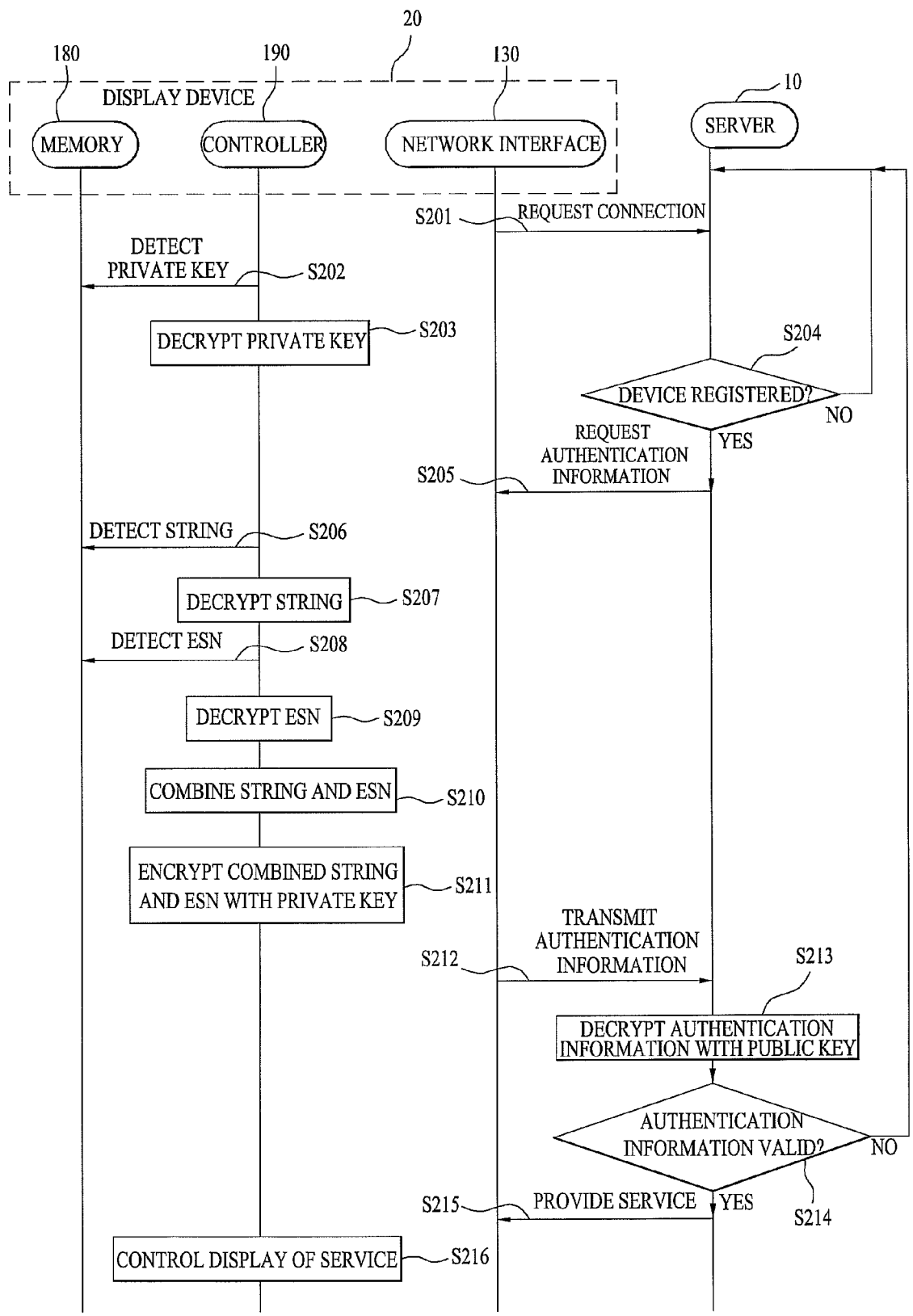
FIG. 5 shows another embodiment of a device authentication method.

FIG. 5 shows another embodiment of a device authentication method, in which network interface 130 transmits a connection request signal to the server 10 under the control of the controller 190 (S201). The server 10 may receive the connection request signal. The connection request signal may include a device user-agent.

The controller 190 detects a private key stored in the memory 180 (S202).

The controller 190 decrypts the detected private key (S203).

The server 10 checks whether or not the display device 20 has been registered (S204). The controller 220 may check whether the display device 20 has been registered based on the device user-agent included in the connection request signal. In some embodiments, if the received connection request signal does not include the device user-agent, the controller 220 may request a device user-agent from the display device 20, receive the device user-agent from the display device 20, and check whether or not the display device 20 has been registered based on the received device user-agent.

The controller 220 may check whether the same device user-agent as the device user-agent received from the display device 20 is stored in the memory 230. If the device user-agent of the display device 20 is stored in the memory 230, the controller 220 checks that the display device 20 has been registered. In contrast, if the device user-agent of the display device 20 is not stored in the memory 230, the controller 220 checks that the display device 20 has not been registered.

If it is determined that the display device 20 has not been registered, the server 10 may transmit a message 710 shown in FIG. 7 to the display device 20 and the display device 20 may display the message 710 on a screen 700. The message 710 may indicate that the display device 20 has not been registered in the server 10.

In some embodiments, step S204 may be performed in parallel to steps S202 and S203. That is, while the display device 20 performs steps S202 and S203, the server may perform step S204.

If it is determined that the display device 20 has been registered, the server 10 transmits an authentication information request signal to the display device 20 (S205). The network interface 130 may receive the authentication information request signal from the server 10. The authentication information request signal may be transmitted through a Hypertext Transfer Protocol over Secure Socket Layer (HTTPS) protocol. In some embodiments, steps S202 and S203 may be performed after step S205.

In response to reception of the authentication information request signal, the controller 190 detects a string stored in the memory 180 (S206). The string may be encrypted and stored when manufacturing the display device 20.

The controller 190 decrypts the detected string (S207).

The controller 190 detects an ESN stored in the memory 180 (S208).

The controller 190 decrypts the detected ESN (S209). If the detected ESN is not encrypted, step S209 may not be performed.

The controller 190 combines the decrypted string and the decrypted ESN (S210). In a method of combining the decrypted string and the decrypted ESN, the ESN may be postfixed to the string or the string may be postfixed to the ESN. Hereinafter, the result of combining the string and the ESN is referred to as authentication information.

The controller 190 encrypts the authentication information with the private key decrypted in step S203 (S211). The controller 190 may encrypt the authentication information using any one of a symmetric key algorithm or an asymmetric key algorithm. The controller 190 may use Data Encryption Standard (DES), triple-DES, Advanced Encryption Standard (AES), SEED and ARIA as the symmetric key algorithm. The controller 190 may use a Rivest-Shamir-Adleman (RSA) encryption algorithm as the asymmetric key algorithm. In some embodiments, steps S202 and S203 may be performed between steps S210 and S211.

The network interface 130 transmits the encrypted authentication information to the server 10 (S212). The server 10 may receive the encrypted authentication information. The display device 20 may transmit the encrypted authentication information through a secure socket layer (SSL) and the server 10 may receive the encrypted authentication information through the SSL.

The server 10 decrypts the authentication information received in step S212 with a public key (S213). If the authentication information is encrypted using the symmetric key algorithm, the controller 220 may decrypt the authentication information with the same public key as the private key. If the authentication information is encrypted using the asymmetric key algorithm, the controller 220 may decrypt the authentication information with the public key corresponding to the private key. The private key is a private key of the display device 20 and the public key is a public key of the display device 20. The private key may be stored in the display device 20 when manufacturing the display device 20 and the server 10 may receive the public key corresponding to the private key from the manufacturer of the display device 20.

In some embodiments, if the authentication information is encrypted using the asymmetric key algorithm, the authentication information may be encrypted with the public key in step S211 and may be decrypted with the private key in step S213. In this case, the public key may be a public key of the server 10 and the private key may be a private key of the server 10. The manufacturer of the display device 20 may acquire the public key of the server 10 in advance and store the acquired public key in the display device 20. That is, the public key may be stored in the display device 20 when manufacturing the display device 20.

The server 10 checks whether the decrypted authentication information is valid (S214). The controller 220 may check whether the same authentication information as the decrypted authentication information is stored in the memory 230. If the same authentication information as the decrypted authentication information is stored in the memory 230, the controller 220 may check that the decrypted authentication information is valid. In contrast, if the same authentication information as the decrypted authentication information is not stored in the memory 230, the controller 220 may determine that the decrypted authentication information is not valid. Since the device authentication method according to the present invention performs device authentication using the encrypted string and ESN, it is possible to prevent unauthorized access of the display device without access rights and prevent a display device without access rights from pretending to have access rights.

Figure 10:
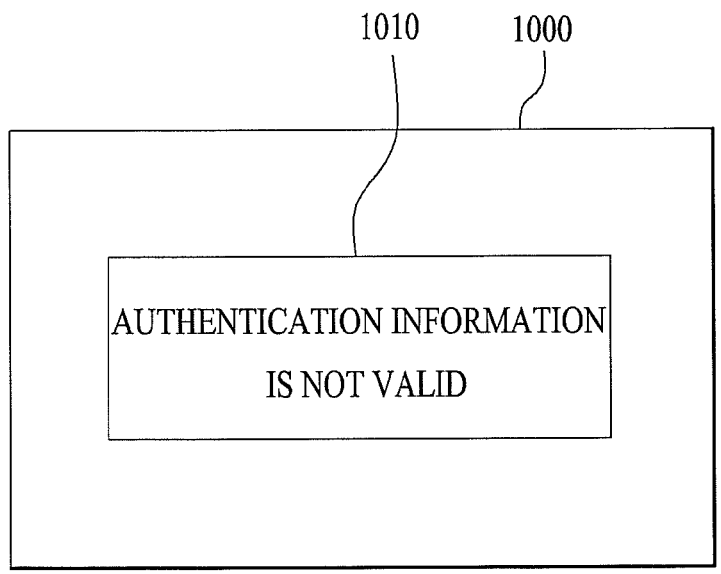
FIG. 10 shows a message displayed when authentication data is invalid.

If it is determined that the decrypted authentication information is not valid, the server 10 may transmit a message 1010 shown in FIG. 10 to the display device 20 and the display device 20 may display the message 1010 on a screen 1000. The message 1010 may indicate that the authentication information of the display device 20 is not valid.

If the decrypted authentication information is valid, the server 10 provides a service to the display device 20 (S215). That is, if the decrypted authentication information is valid, the display device 20 successfully performs device authentication. The network interface 130 may receive the service from the server 10. The service may be at least one of a real-time broadcast service and an Internet service.

The controller 190 controls the display of the service received from the server 10 (S216). That is, the display 150 may display the image of the received service on the screen and the audio output unit 160 may output the sound of the received service.

Figure 6:
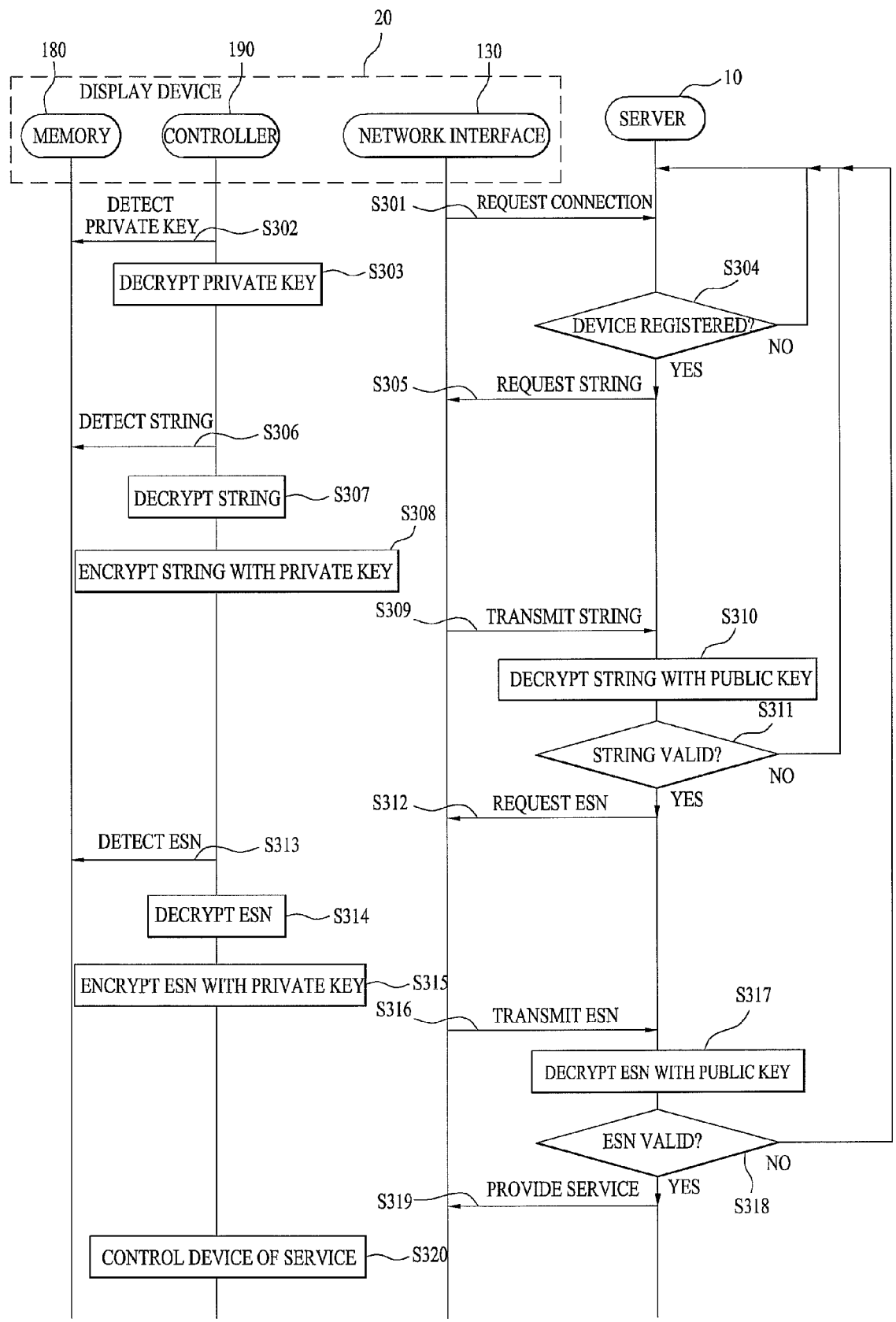
FIG. 6 shows another embodiment of a device authentication method.

FIG. 6 shows another embodiment of a device authentication method, in which network interface 130 transmits a connection request signal to the server 10 under the control of the controller 190 (S301). The server 10 may receive the connection request signal. The connection request signal may include a device user-agent.

The controller 190 detects a private key stored in the memory 180 (S302).

The controller 190 decrypts the detected private key (S303).

The server 10 checks whether or not the display device 20 has been registered (S304). The controller 220 may check whether the display device 20 has been registered based on the device user-agent included in the connection request signal. In some embodiments, if the received connection request signal does not include the device user-agent, the controller 220 may request a device user-agent from the display device 20, receive the device user-agent from the display device 20, and check whether or not the display device 20 has been registered based on the received device user-agent.

The controller 220 may check whether the same device user-agent as the device user-agent received from the display device 20 is stored in the memory 230. If the device user-agent of the display device 20 is stored in the memory 230, the controller 220 checks that the display device 20 has been registered. In contrast, if the device user-agent of the display device 20 is not stored in the memory 230, the controller 220 checks that the display device 20 has not been registered.

If it is determined that the display device 20 has not been registered, the server 10 may transmit a message 710 shown in FIG. 7 to the display device 20 and the display device 20 may display the message 710 on a screen 700. The message 710 may indicate that the display device 20 has not been registered in the server 10.

In some embodiments, step S304 may be performed in parallel to steps S302 and S303. That is, while the display device 20 performs steps S302 and S303, the server may perform step S304.

If it is determined that the display device 20 has been registered, the server 10 transmits a string request signal to the display device 20 (S305). The network interface 130 may receive the string request signal from the server 10. The string request signal may be transmitted through a Hypertext Transfer Protocol over Secure Socket Layer (HTTPS) protocol. In some embodiments, steps S302 and S303 may be performed after step S305.

In response to reception of the string request signal, the controller 190 detects a string stored in the memory 180 (S306). The string may be encrypted and stored when manufacturing the display device 20. Since the device authentication method according to the present invention performs device authentication using the encrypted string, it is possible to prevent unauthorized access of the display device and prevent a display device without access rights from pretending to have access rights.

The controller 190 decrypts the detected string (S307).

The controller 190 encrypts the decrypted string with the private key decrypted in step S303 (S308). The controller 190 may encrypt the decrypted string using any one of a symmetric key algorithm or an asymmetric key algorithm. The controller 190 may use Data Encryption Standard (DES), triple-DES, Advanced Encryption Standard (AES), SEED and ARIA as the symmetric key algorithm. The controller 190 may use a Rivest-Shamir-Adleman (RSA) encryption algorithm as the asymmetric key algorithm. In some embodiments, steps S302 and S303 may be performed between steps S307 and S308.

The network interface 130 transmits the encrypted string to the server 10 (S309). The server 10 may receive the encrypted string. The display device 20 may transmit the encrypted string through a secure socket layer (SSL) and the server 10 may receive the encrypted authentication information through the SSL.

The server 10 decrypts the string received in step S309 with a public key (S310). If the string is encrypted using the symmetric key algorithm, the controller 220 may decrypt the string with the same public key as the private key. If the string is encrypted using the asymmetric key algorithm, the controller 220 may decrypt the string with the public key corresponding to the private key. The private key is a private key of the display device 20 and the public key is a public key of the display device 20. The private key may be stored in the display device 20 when manufacturing the display device 20 and the server 10 may receive the public key corresponding to the private key from the manufacturer of the display device 20.

In some embodiments, if the string is encrypted using the asymmetric key algorithm, the string may be encrypted with the public key in step S308 and may be decrypted with the private key in step S310. In this case, the public key may be a public key of the server 10 and the private key may be a private key of the server 10. The manufacturer of the display device 20 may acquire the public key of the server 10 in advance and store the acquired public key in the display device 20. That is, the public key may be stored in the display device 20 when manufacturing the display device 20.

The server 10 checks whether the decrypted string is valid (S311). The controller 220 may check whether the same string as the decrypted string is stored in the memory 230. If the same string as the decrypted string is stored in the memory 230, the controller 220 may check that the decrypted string is valid. In contrast, if the same string as the decrypted string is not stored in the memory 230, the controller 220 may check that the decrypted string is not valid.

If it is determined that the decrypted string is not valid, the server 10 may transmit a message 910 shown in FIG. 9 to the display device 20 and the display device 20 may display the message 910 on a screen 900. The message 910 may indicate that the authentication information of the display device 20 is not valid.

If the decrypted string is valid, the server 10 transmits an ESN request signal to the display device 20 (S312). The network interface 130 may receive the ESN request signal from the server 10. The ESN request signal may be transmitted through a Hypertext Transfer Protocol over Secure Socket Layer (HTTPS) protocol.

In response to reception of the ESN request signal, the controller 190 detects an ESN stored in the memory 180

(S313). The controller 190 decrypts the detected ESN (S314). If the detected ESN is not encrypted, step S314 may not be performed.

The controller 190 encrypts the decrypted ESN with the private key decrypted in step S303 (S315). The controller 190 may encrypt the decrypted ESN using any one of a symmetric key algorithm or an asymmetric key algorithm. The controller 190 may use Data Encryption Standard (DES), triple-DES, Advanced Encryption Standard (AES), SEED and ARIA as the symmetric key algorithm. The controller 190 may use a Rivest-Shamir-Adleman (RSA) encryption algorithm as the asymmetric key algorithm.

The network interface 130 transmits the encrypted ESN to the server 10 (S316). The server 10 may receive the encrypted ESN. The display device 20 may transmit the encrypted ESN through a secure socket layer (SSL) and the server 10 may receive the encrypted ESN through the SSL.

The server 10 decrypts the ESN received in step S316 with a public key (S317). If the ESN is encrypted using the symmetric key algorithm, the controller 220 may decrypt the ESN with the same public key as the private key. If the ESN is encrypted using the asymmetric key algorithm, the controller 220 may decrypt the ESN with the public key corresponding to the private key. The private key is a private key of the display device 20 and the public key is a public key of the display device 20. The private key may be stored in the display device 20 when manufacturing the display device 20 and the server 10 may receive the public key corresponding to the private key from the manufacturer of the display device 20.

In some embodiments, if the ESN is encrypted using the asymmetric key algorithm, the ESN may be encrypted with the public key in step S315 and may be decrypted with the private key in step S317. In this case, the public key may be a public key of the server 10 and the private key may be a private key of the server 10. The manufacturer of the display device 20 may acquire the public key of the server 10 in advance and store the acquired public key in the display device 20. That is, the public key may be stored in the display device 20 when manufacturing the display device 20.

The server 10 checks whether the decrypted ESN is valid (S318). The controller 220 may check whether the same ESN as the decrypted ESN is stored in the memory 230. If the same ESN as the decrypted ESN is stored in the memory 230, the controller 220 may check that the decrypted ESN is valid. In contrast, if the same ESN as the decrypted ESN is not stored in the memory 230, the controller 220 may determine that the decrypted ESN is not valid.

If it is determined that the decrypted ESN is not valid, the server 10 may transmit a message 810 shown in FIG. 8 to the display device 20 and the display device 20 may display the message 810 on a screen 800. The message 810 may indicate that the ESN of the display device 20 is not valid.

If the decrypted ESN is valid, the server 10 provides a service to the display device 20 (S319). That is, if the decrypted ESN is valid, the display device 20 successfully performs device authentication. The network interface 130 may receive the service from the server 10. The service may be at least one of a real-time broadcast service and an Internet service.

The controller 190 controls the display of the service received from the server 10 (S320). That is, the display 150 may display the image of the received service on the screen and the audio output unit 160 may output the sound of the received service.

In some embodiments, after steps S301 to S311 are performed, if the decrypted string is valid, steps S319 and S320 may be performed.

According to one or more embodiments of the display device, the server and the device authentication method, by encrypting and storing authentication information, it is possible to prevent authentication information from being faked so as to prevent access of an unauthorized display device and prevent a user from utilizing an unauthorized display device. Since authentication information is encrypted and transmitted, it is possible to prevent the authentication information from being leaked in a transmission process.

According to another embodiment, computer-readable code may be stored on a computer-readable recording medium that performs any of the embodiments of the methods described herein and/or which controls operations of the embodiments of the apparatuses described herein.

The computer-readable recording medium may be any of a variety of data storage devices that can store data which can be thereafter read by a computer system. Examples include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

In accordance with another embodiment, an apparatus for a television comprises a first storage area to store a key; a second storage area to store authentication information; a communication unit to transmit a first signal requesting connection to a server through a network and to receive a second signal from the server requesting authentication information for the television; and a controller to control output of the protected content received from the server based on an authentication procedure. The authentication procedure includes: encryption of the stored authentication information with the key, transmission of a third signal which includes the encrypted authentication information to the server, and outputting the protected content received from the server for display after transmission of the third signal.

The apparatus may be included in the television or in a device coupled to the television such but not limited to as a set-top box or a box which controls Internet access or otherwise controls display of information on the screen of a television. In another embodiment, the apparatus may be coupled to a display device different from a television.

The authentication information may include a string stored in the second storage area, or the authentication information may include an Electronic Serial Number (ESN) stored in the second storage area. The authentication information may also include both a string and an Electronic Serial Number (ESN) stored in the second storage area. The authentication information may be stored in encrypted or non-encrypted form in the second storage area.

In one application, the authentication information is stored in a non-encrypted form in the second storage area, and the controller controls decryption of the authentication information retrieved from the second storage area prior to decryption of the authentication information with the key. The key may be a private key or another type of key.

The communication unit may receive a fourth signal from the server requesting additional information for authenticating the television, and the controller controls encryption of the additional authentication information with the stored key and transmission of a fifth signal including the encrypted additional authentication information to the server after receiving the fourth signal, and controls output of the protected content for display after transmission of the fifth signal.

The apparatus may also include a device to receive information indicative of a gesture of a user, wherein the controller interprets the gesture information as a command for performing a predetermined operation.

The communication unit receives information may indicate that the encrypted authentication information transmitted in the third signal is invalid, and the controller control output of a message for display based on the received information indicating that the encrypted authentication information is invalid.

In accordance with another embodiment, a method for managing information for a television comprises storing a key in a first storage area; storing authentication information in a second storage area; and performing an authentication procedure which includes: transmitting a first signal requesting a connection to a server, receiving a second signal from the server requesting authentication information for a television; and encrypting the stored authentication information with the key, transmitting a third signal which includes the encrypted authentication information to the server, and controlling output of protected content received from the server for display after transmission of the third signal. The key may be a private key or another type of key.

The authentication information may include a string stored in the second storage area, or the authentication information may include an Electronic Serial Number (ESN) stored in the second storage area. The authentication information may include both a string and an Electronic Serial Number (ESN) stored in the second storage area.

In accordance with another embodiment, a method for managing information for a television comprises: storing encryption information in a first storage area; storing first authentication information in a second storage area; storing third authentication information in a third storage area; transmitting the first authentication information to a server, the first authentication information encrypted with the stored encryption information; transmitting the second authentication information to the server; and controlling output of protected content received from the server for display on a screen of a television after transmission of the third signal.

Each of the first and second authentication information may include one of a string or an electronic serial number. The method may further comprise: encrypting the second authentication information prior to transmission of the second authentication information to the server. The encryption information may include a key, which may be a private key or another type of key.

In accordance with another embodiment, a device authentication method comprises transmitting a first signal requesting connection to a server, receiving a second signal requesting authentication information for device authentication from the server, encrypting the authentication information with a stored private key in response to reception of the second signal, and transmitting a third signal including the encrypted authentication information to the server. The authentication information is one of a stored string, an Electronic Serial Number (ESN) and a combination of the stored string and the ESN.

The encrypting includes decrypting the stored string, and encrypting the decrypted string with the private key. The encrypting includes decrypting the stored string, combining the decrypted string and the ESN, and encrypting the combined string with the private key.

The device authentication method further comprises receiving a fourth signal requesting second authentication information for device authentication from the server, encrypting the second authentication information with the stored private key in response to reception of the fourth signal and transmitting a fifth signal including the encrypted second authentication information to the server.

In another embodiment, a display device comprises a communication unit configured to transmit a first signal requesting connection to a server and receive a second signal requesting authentication information for device authentication from the server, a memory configured to store a private key, and a controller configured to control encryption of the authentication information with the private key and transmission of a third signal including the encrypted authentication information to the server. The authentication information is one of a string stored in the memory, an Electronic Serial Number (ESN) and a combination of the stored string and the ESN.

The controller detects the string, decrypts the detected string and encrypts the decrypted string with the private key.

The controller detects the string and the ESN from the memory, decrypts the detected string, combines the decrypted string and the detected ESN, and encrypts the combined string with the private key.

The communication unit further receives a fourth signal requesting second authentication information for device authentication from the server, and the controller controls encryption of the second authentication information with the stored private key and transmission of a fifth signal including the encrypted second authentication information to the server, in response to reception of the fourth signal.

In another embodiment, a device authentication method comprises receiving a first signal requesting connection from a display device, transmitting a second signal requesting authentication information for device authentication to the display device in response to reception of the first signal, receiving a third signal including the encrypted authentication information from the display device, decrypting the encrypted authentication information with a public key in response to reception of the third signal and performing authentication of the display device using the encrypted authentication information. The authentication information is one of a string stored in the display device, an Electronic Serial Number (ESN) of the display device and a combination of the string and the ESN.

The performing the authentication of the display device includes checking whether the decrypted authentication information is equal to authentication information stored in a server.

The performing the authentication of the display device includes checking whether the decrypted authentication information is equal to a combination of a string stored in a server and an Electronic Serial Number (ESN) stored in the server.

The device authentication method further comprises transmitting a fourth signal requesting second authentication information for device authentication to the display device according to the result of performing the authentication of the display device, and receiving a fifth signal including the encrypted authentication information from the display device.

In another embodiment, a server comprises a communication unit configured to receive a first signal requesting connection and a second signal including encrypted authentication information from a display device, and a controller configured to control transmission of a third signal requesting authentication information for device authentication to the display device in response to reception of the first signal, decrypt the encrypted authentication information with a public key in response to reception of the second signal, and perform authentication of the display device using the decrypted authentication information. The authentication information is one of a stored string, an Electronic Serial Number (ESN) and a combination of the stored string and the ESN.

The controller checks whether the decrypted authentication information is equal to stored authentication information.

The controller checks whether the decrypted authentication information is equal to a combination of a stored string and an Electronic Serial Number (ESN).

The controller controls transmission of a fourth signal requesting second authentication information for device authentication to the display device according to the result of performing the authentication of the display device, and the communication unit receives a fifth signal including the encrypted authentication information from the display device.

One or more embodiments described herein, therefore, is to provide a television or other display device, a server and/or a device authentication method which prevents access of protected content to an unauthenticated device and, thus, to prevent authentication information leakage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one or more embodiments may be combined with the features of the remaining embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for a television comprising:
a first storage area to store a key;
a second storage area to store authentication information in an encrypted form;
a transceiver to transmit a first signal requesting connection to a server through a network and to receive a second signal from the server requesting authentication information for the television; and
a controller to control output of the protected content received from the server based on an authentication procedure, wherein the authentication procedure includes:
detection of the authentication information stored in the second storage area in the encrypted form,
decryption of the detected authentication information stored in the encrypted form,
encryption of the decrypted authentication information with the key,
transmission of a third signal that includes the encrypted authentication information to the server,
reception of a fourth signal requesting additional authentication information for authenticating the television from the server,
encryption of the additional authentication information with the stored key,
transmission of a fifth signal including the encrypted additional authentication information to the server, and
outputting the protected content received from the server for display after transmission of the fifth signal.

2. The apparatus of claim 1, wherein the authentication information includes a string stored in the second storage area in an encrypted form.

3. The apparatus of claim 1, wherein the authentication information includes an Electronic Serial Number (ESN) stored in the second storage area.

4. The apparatus of claim 1, wherein the authentication information includes a string and an Electronic Serial Number (ESN) stored in the second storage area.

5. The apparatus of claim 1, further comprising:
a device to receive information indicative of a gesture of a user,
wherein the controller interprets the gesture information as a command for performing a predetermined operation.

6. The apparatus of claim 1, wherein the key is a private key.

7. The apparatus of claim 1, wherein:
the transceiver receives information indicating that the encrypted authentication information transmitted in the third signal is invalid, and
the controller controls output of a message for display based on the received information indicating that the encrypted authentication information is invalid.

8. A method for managing information for a television, comprising:
storing a key in a first storage area;
storing authentication information in a second storage area, wherein the authentication information is stored in an encrypted form; and
performing an authentication procedure that includes:
transmitting a first signal requesting a connection to a server,
receiving a second signal from the server requesting authentication information for the television,
detecting the authentication information in the encrypted form from the second storage area,
decrypting the detected authentication information stored in the encrypted form,
encrypting the decrypted authentication information with the key,
transmitting a third signal that includes the encrypted authentication information to the server,
receiving a fourth signal from the server requesting additional information for authenticating the television,
encrypting the additional authentication information with the key,
transmitting a fifth signal including the encrypted additional authentication information to the server after receiving the fourth signal, and
controlling output of protected content received from the server for display after transmission of the fifth signal.

9. The method of claim 8, wherein the authentication information includes a string stored in the second storage area in an encrypted form.

10. The method of claim 8, wherein the authentication information includes an Electronic Serial Number (ESN) stored in the second storage area.

11. The method of claim 8, wherein the authentication information includes a string and an Electronic Serial Number (ESN) stored in the second storage area.

12. The method of claim 8, wherein the key is a private key.

* * * * *